April 21, 1953 — L. HORNBOSTEL — 2,635,475
AIR-OPERATED FELT GUIDE
Filed Aug. 17, 1950 — 3 Sheets-Sheet 1
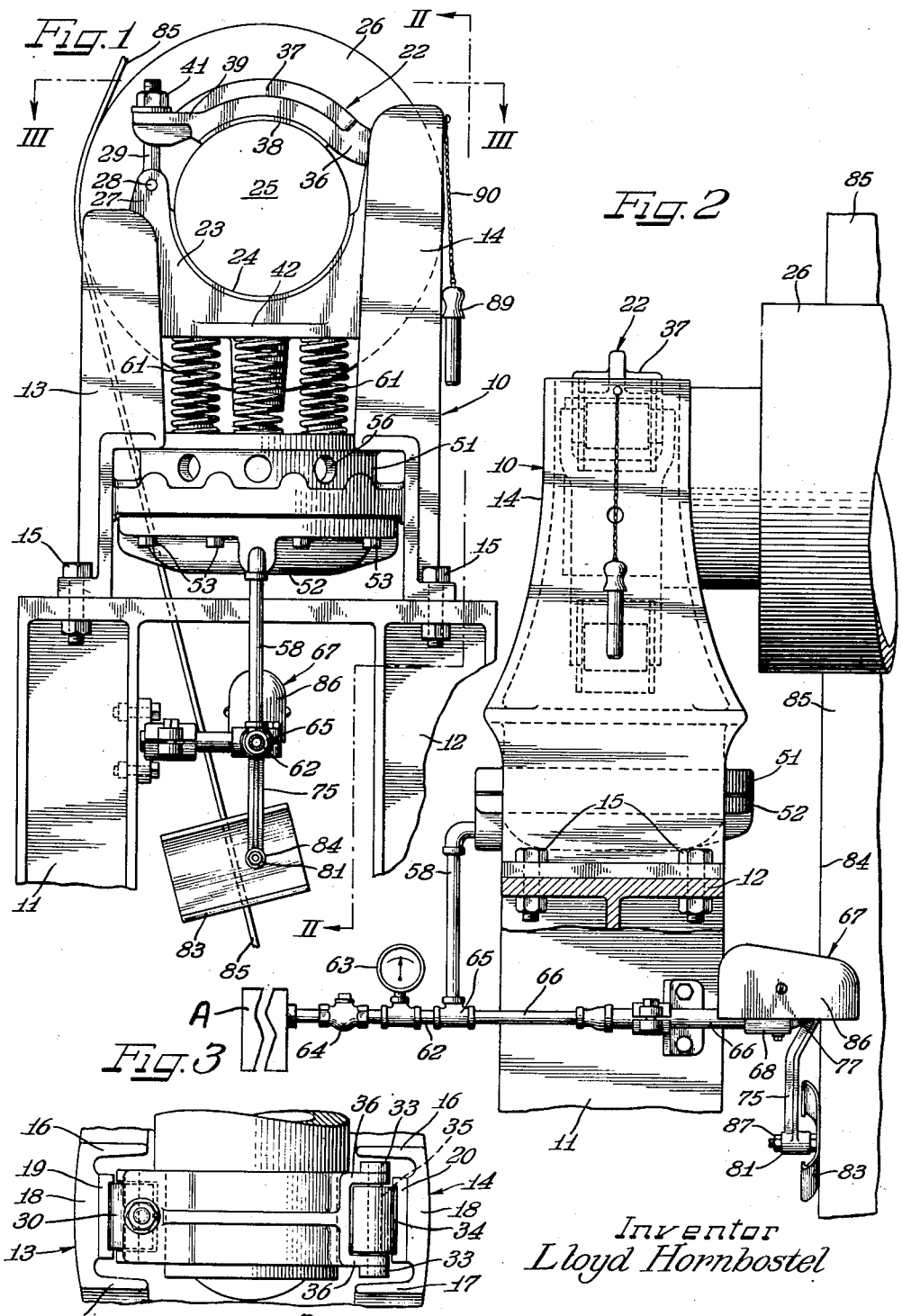
Inventor
Lloyd Hornbostel

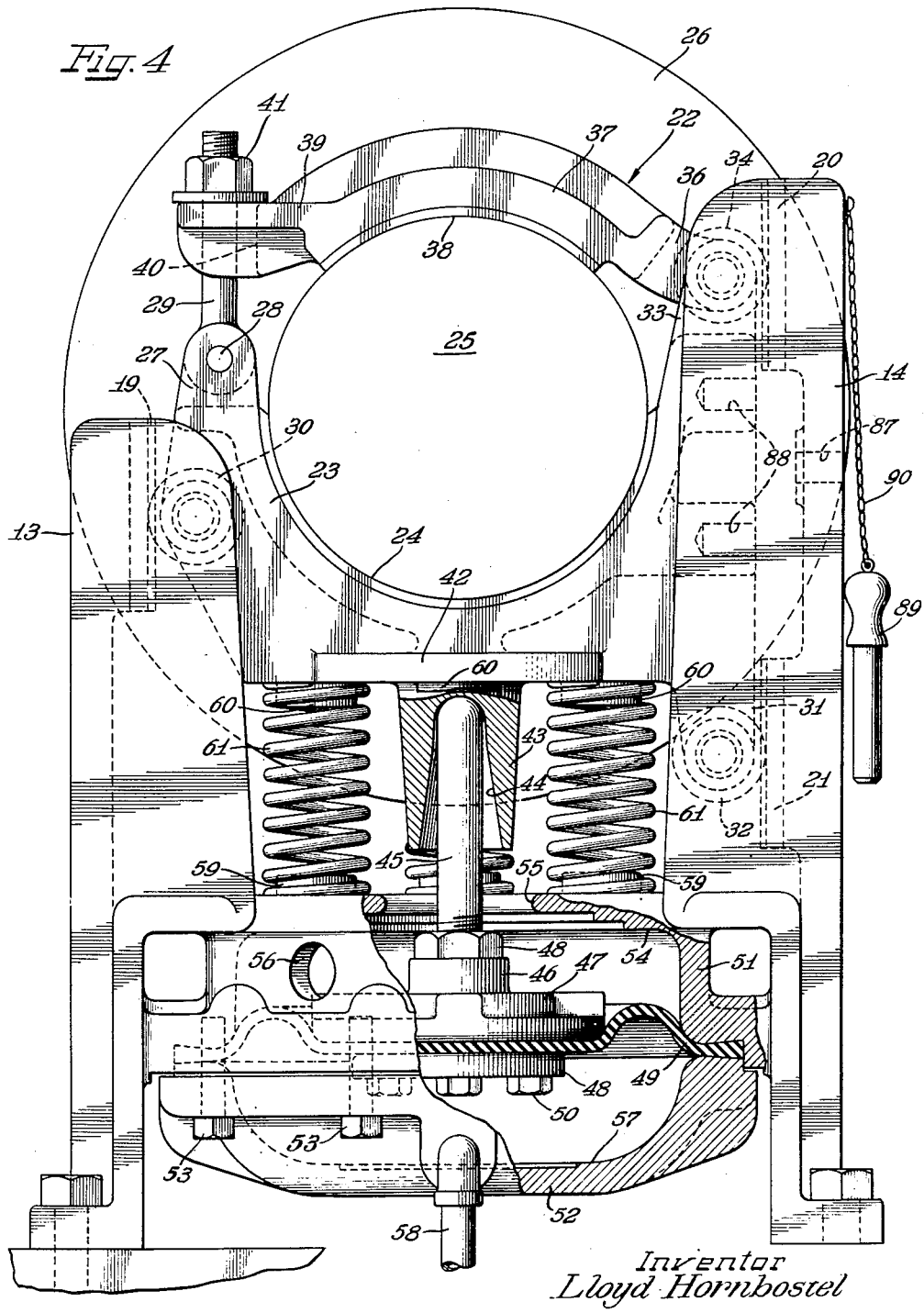

Inventor
Lloyd Hornbostel

Patented Apr. 21, 1953

2,635,475

UNITED STATES PATENT OFFICE 2,635,475

AIR-OPERATED FELT GUIDE

Lloyd Hornbostel, Beloit, Wis., assignor to Beloit Iron Works, Beloit, Wis., a corporation of Wisconsin Application August 17, 1950, Serial No. 180,011

14 Claims. (Cl. 74—241)

The present invention relates to an air-operated felt guide and more particularly to a guide for a felt or the like responsive to differential fluid pressures for shifting a felt guiding means vertically to control the training of a felt therearound.

In the prior art various types of felt guides have been proposed for keeping a felt, paper web, or the like, properly directed and uniformly lapped about a guiding means for the felt, such as the guide roll of a paper machine press section. The prior art felt guide means generally utilize longitudinal pivoting movement of the guide roll as the means for controlling training of the felt thereabout. Consequently, the guide roll is mounted for pivoting movement in a horizontal plane, either about a central pivot or by means of a pivot link attached to one end of the guide roll. Such devices have proved to be unsatisfactory for certain applications due to the difficulty of controlling the direction of movement of a vertically traveling web, and also due to the necessity of pivoting the relatively large rolls themselves.

The present invention now provides an improved felt guide which is particularly adapted for guiding vertically traveling felts, although it will be appreciated that horizontally traveling felts may also be controlled by utilization of the device of the present invention.

The present invention generally includes a bearing saddle for receiving the bearing housing of a guide roll, the bearing saddle being mounted for vertical movement between a pair of supporting uprights which are provided with oppositely disposed tracks upon which rollers carried by the bearing saddle are disposed for movement. Vertical movement of the bearing saddle itself is actuated by means of fluid pressure responsive means, such as a flexible diaphragm disposed adjacent the bearing saddle and subjected to differential fluid pressure, such as air pressure. The diaphragm carries an actuating extension for movement therewith in accordance with movement of the diaphragm under differential fluid pressure, and the diaphragm actuating extension causes corresponding movement of the bearing saddle.

In order to aid movement of the bearing saddle, resilient means, such as compression springs, are interposed between the bearing saddle and the diaphragm. The resilient means carry a proportional share of the weight of the roll and the bearing saddle, the springs in cooperation with the diaphragm causing the bearing saddle to assume varying vertically displaced positions.

The differential fluid pressure to which the diaphragm is subjected is preferably controlled by a felt-actuated pressure bleed valve. More particularly, fluid under pressure is vented to one side of the diaphragm for causing movement thereof, and also through a bleed valve having a paddle or other following means contacting one edge of the felt to be guided.

The paddle is utilized to control the position of a valving element of the bleed valve, so that movement of the felt, and consequently of the paddle, in one direction increases the bleeding of air from the valve, reducing the fluid pressure on the diaphragm to allow the roll weight to lower the bearing saddle against the reduced pressure exerted by the diaphragm. Movement of the felt and the paddle in the other direction hinders the bleeding of air from the diaphragm, so that air pressure on the diaphragm is increased and the bearing saddle is actuated vertically away from the diaphragm. It will be appreciated that these vertical tilting movements of one end of the guide roll are accommodated by suitable spherical or other pivotal bearing means at the other end of the guide roll, so that roll tilting controls the training of the felt about the roll.

It is, therefore, an important object of the present invention to provide an improved vertically movable, fluid pressure actuated felt guide.

Another object of the present invention is to provide improved means for guiding a traveling felt about a guide roll, including vertically movable means supporting one end of the roll, fluid pressure actuated diaphragm for controlling vertical positioning of the roll carrying means, and means responsive to the lateral shifting of the felt to shift the roll carrying means vertically to compensate for variations in the direction of travel of the felt.

It is a further important object of the present invention to provide an improved felt guiding means including a bearing saddle for supporting one end of a guide roll having a felt trained thereabout, differential fluid pressure actuating means for shifting the bearing saddle, spring means interposed between the bearing saddle and the actuating means for cooperation therewith to aid in positioning the bearing saddle, and follower means contacting the felt and actuated thereby for varying the fluid pressure on the actuating means in accordance with lateral shifting of the felt.

Still another important object of the present invention is to provide a vertically shiftable mounting for one end of a guide roll having a felt lapped thereabout, including fluid pressure responsive means for shifting the mounting, and valve means for controlling actuation of the fluid pressure responsive means and including a follower contacting one edge of the felt.

A more specific object of the present invention is to provide an air operated guide for a felt lapped about a guide roll, including a bearing saddle, a support structure journaling the bearing saddle, a support structure journaling the bearing saddle for movement in a vertical direction, a fluid pressure actuated flexible diaphragm having a valve controlled vent to the atmosphere to support the weight of the bearing saddle and the roll, springs interposed between the bearing saddle and the diaphragm for aiding in the support of the weight of the roll, and a paddle contacting one edge of the felt and responsive to shifting of the felt relative to the roll for varying the air pressure on the diaphragm to thereby shift the vertical position of the bearing saddle and that of the roll carried thereby.

Other and further important objects of this invention will be apparent from the disclosures in the specification and the accompanying drawings.

On the drawings:

Figure 1 is a side elevational view of a felt guide of the present invention;

Figure 2 is a sectional view, with parts shown in elevation, taken along the plane II—II of Figure 1;

Figure 3 is a sectional view, with parts shown in elevation, taken along the plane III—III of Figure 1;

Figure 4 is an enlarged side elevational view, similar to Figure 1, and with parts broken away and in section.

As shown on the drawings:

Figure 5:
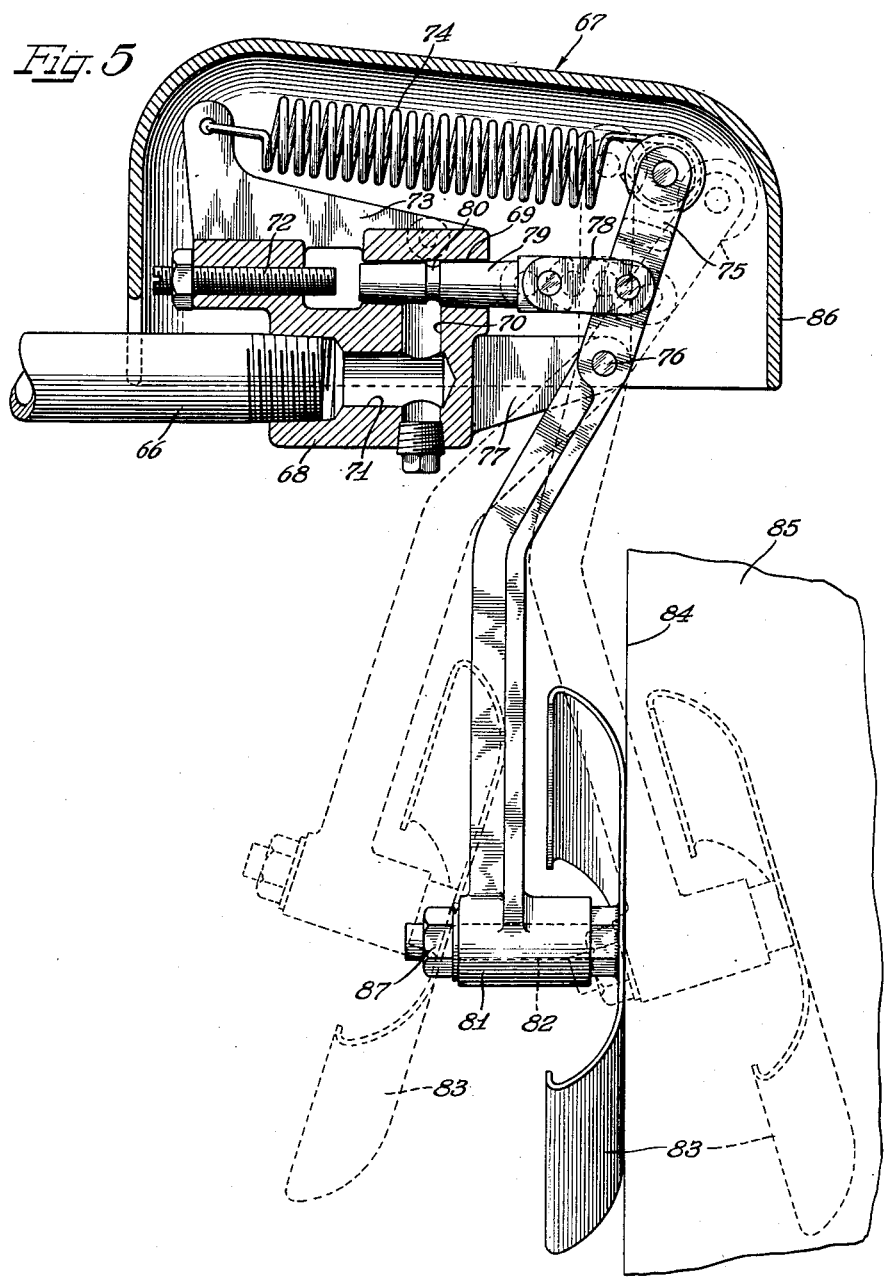
Figure 5 is an enlarged fragmentary sectional view, with parts broken away and in sections, of a follower paddle and bleed valve assembly for use with a felt guide of the present invention.

In Figure 1, reference numeral 10 refers generally to an air-operated vertical felt guide of the present invention, including a pair of upstanding spaced posts 11 and 12, respectively, carrying thereon a pair of vertically extending spaced uprights 13 and 14 secured to the posts 11 and 12, respectively, by suitable means, as by bolts and nuts 15.

As best shown in Figure 3, each of the upstanding uprights 13 and 14 is of generally U-shaped configuration having opposed legs 16 and 17 projecting inwardly therefrom on each side of a central web portion 18. The opposing web portion 18 of the upright 13 has secured thereto on its inner face a track 19. The upright 14 carries on its inner face a pair of vertically spaced tracks 20—21 of substantially the same length as the track 19. The tracks 19, 20 and 21 of the uprights 13 and 14, respectively, extend vertically in spaced parallel relation for a purpose to be hereinafter more fully described.

A bearing saddle 22 is disposed between the uprights 13 and 14. The bearing saddle 22 comprises a lower section 23 having an arcuate central recess 24 adapted to receive therein a guide roll bearing housing 25 at one end of a guide roll 26. The other end of the roll 26 is supported within a bearing accommodating limited vertical pivoting movement. Such a bearing may take the form of a spherical bearing (not shown but well known in the art). The lower section 23 of the bearing saddle is provided with a pair of upstanding spaced terminal arms 27 joined by a pivot pin 28 extending through the end of a swivel bolt 29.

The arms 27 also journal therebetween a cylindrical roller 30 extending into contact with the track 19 carried by the upright 13, the roller 30 being adapted to roll along the track 19 in a generally vertical direction.

The lower section 23 of the bearing saddle 22 is provided with a pair of spaced depending lugs 31 journaling therebetween a rotatable roller 32 for rolling contact with the lower track 21 carried by the upright 14.

That portion of the roller section 24 of the bearing saddle 22 opposing the arm 27 is provided with a pair of spaced upstanding arms 33 which journal therebetween a roller 34 for rolling contact with the track 20 also carried by the upright 14. As best seen in Figure 3, the roller 34 is journaled by a pin 35, and a pair of spaced parallel terminal arms 36 mounted on an upper arcuate section 37 of the bearing saddle 22 are interposed between each of the arms 33 on the roller 34. The arms 36 are apertured to receive therethrough the pin 35, and it will be appreciated that the pin pivotally connects the upper saddle section 37 to the lower section 24 for pivoting movement relative thereto.

The central portion of the upper section 37 is provided with an arcuate inner surface 38 having a center of curvature coincident with that of the arcuate recess 24 of the lower saddle section 23 and adapted to overlie the bearing housing 25 of the roll 26. The terminal end 39 of the upper section 37 extends laterally therefrom to overlie the upstanding arms 27 of the lower section 23, and the portion 39 is centrally split, as at 40, to receive a bolt 29 having a nut 41 overlying the portion 39 and retaining the section 23 in position to overlie the housing 25.

It will thus be seen that the rollers 30, 32 and 34 accommodate vertical movement of the bearing saddle 22 between the uprights 13 and 14. The upright 14 is provided with a central aperture 87 and the bearing saddle lower section 23 is provided with a pair of vertically spaced recesses 88 for registry with the aperture 87 at adjusted positions of the saddle. A pin 89, secured to the upright 14 by a chain 90, is insertable into the registering aperture and recesses to retain the saddle in adjusted position as desired.

The lower section 24 of the bearing saddle 22 is provided with a pair of oppositely directed lower lateral flanges 42 and a centrally located lower depending socket boss 43 having an interior downwardly opening recess 44 (Figure 4).

The socket 44 receives an actuating rod 45 which is threaded at its lower end into an upstanding boss 46 carried by a diaphragm plate 47. The rod 45 is locked to the boss 46 by means of a lock nut 48. The diaphragm plate 47 cooperates with a smaller diaphragm plate 48 to confine therebetween a central portion of a flexible air impermeable diaphragm 49. The plates 47 and 48 are secured together by suitable means, as by bolts 50.

The diaphragm 49 is peripherally clamped between a pair of cooperating clamping plates 51 and 52 secured by suitable means, as by screws 53. The upper plate 51 is secured, by welding or the like, to the uprights 13 and 14, and this plate defines an interior upwardly dished diaphragm chamber 54 provided with an upper central passage 55 for receiving the diaphragm rod 45 therethrough. The upper plate is also provided with a plurality of peripheral radial apertures 56 which cooperate with the central aperture 55 to establish communication between the chamber 54 and the surrounding atmosphere. Thus, the chamber 54 is always retained at circumambient atmospheric pressure.

The lower plate 52 is provided with an inner downwardly dished chamber 57 communicating with a source of fluid under pressure through a pipe or conduit 58. It will be seen that the chamber 57 is sealed from the chamber 54 by means of the diaphragm 49 interposed between the plates 51 and 52, and the diaphragm also serves to seal these plates to one another.

The upper surface of the upper plate 51 is provided with a plurality of upstanding, relatively short cylindrical bosses 59, while the lower surface of the lower bearing saddle section 23 and the laterally extending flanges 42 are provided with corresponding vertically aligned bosses 60. A helically coiled compression spring 61 is confined between each pair of vertically aligned bosses 59—60, the springs thus being interposed between the bearing saddle and the upper diaphragm plate 51. Although four springs 61 have been illustrated, it will be appreciated that more or less than this number may be employed as desired.

From Figure 2 it will be seen that the conduit 58 communicates with a fluid pressure line 62 which in turn communicates with a source of fluid under pressure (shown diagrammatically as the compressed air tank A) through a pressure gauge 63 and a pressure control valve 64. The conduits 58 and 62 are joined at a T-fitting 65 which also carries a bleeder conduit 66 having at the free end thereof a bleeder valve 67.

The bleeder valve assembly 67 is best illustrated in Figure 5 and includes a valve body 68 having an upper frusto-conical port 69 communicating with the conduit 66 through passages 70 and 71. The valve body 68 carries a set screw 72 threadedly adjustable axially with respect to the port 69 and carried by an upwardly extending rib 73. A tension spring 74 is secured at one end to said rib 73. The other end of the tension spring 74 is secured to the free upper end of a valve actuating arm 75 which is pivoted immediate its length, as at 76, to a lug 77 carried by the valve body 68. The arm 75 is pivoted intermediate its points of attachment to the lug 77 and to the spring 74 to a pivoted link 78 carried by a frusto-conical valve body 79 reciprocable within the frusto-conical valve port 69 and having a peripheral recess 80 intermediate its length. The free lower end of the arm 75 is provided with a cylindrical boss 81 having a bolt 82 extending therethrough. The bolt 82 carries at one end a paddle 83 and at the other end a lock nut 87. The paddle 83 takes the form of sheet-like member having opposing curled edges and a substantially plane intermediate portion adapted for contacting one edge 84 of a felt or web 85 lapped about the guide roll 26. The spring 74 urges the arm 75 about the pivot point 76 into sliding contact with the felt edge 84.

The operation of the present invention will be readily understood by those skilled in the art from the description hereinbefore set forth. Fluid under pressure within the conduit 62 is mainly directed through the conduit 58 to the lower diaphragm chamber 57 at substantially the same pressure as that maintained within the conduit 66. The pressure within the chamber 57 will act directly upon the diaphragm 49 so that the diaphragm is subjected to a differential pressure equivalent to the difference between the pressure within the chamber 57 and atmospheric pressure within the chamber 54. The diaphragm, through its rod 45 and in cooperation with the springs 61, will support the weight of that end of the roll 26 mounted within the bearing saddle 22. It will be seen that, upon an increase of pressure within the diaphragm pressure chamber 57, the diaphragm 49 will be actuated in an upward direction and the actuating rod 45 will shove the bearing saddle upwardly between the spaced uprights 13 and 14. In such an upward thrust, the springs 61 will exert a compressive force upwardly to aid such movement, while the rolling contact of the rollers 30, 32 and 34 will accommodate the movement.

It will be appreciated that the compression force exerted by the springs 61 increases as the bearing saddle 22 approaches the diaphragm housing. Thus, a greater upward thrust will be exerted by the compression springs 61 when the bearing saddle is in lower position. Further, when the bearing saddle is in an upper position, the springs 61 are relatively extended so that relatively small differences in pressure within the diaphragm pressure chamber 57 will cause relatively greater movement of the bearing saddle.

It will also be seen that the springs resiliently accommodate movement of the bearing saddle, while at the same time dampening any rapid fluctuations of the saddle in a vertical direction. Thus, when a felt having a relatively rough edge 84 is in contact with the paddle 83, this rough edge will not cause undue hunting or searching movement of the bearing saddle.

Although the springs 61 aid in supporting the bearing saddle 22 and the roll end carried thereby, the combined compressive strengths of the springs must be less than the weight of the supported elements since the only force tending to move the saddle downwardly between the uprights is that of gravity.

The operation of the bleed valve assembly 67 will also be readily appreciated by those skilled in the art, since fluid pressure within the conduit 66 is constantly bled through the cooperating valve port 69 and valving element 79 when the paddle 83 is in its intermediate solid line position. When the paddle 83 is urged to its right-hand dotted position, as upon movement of the felt to the right, as illustrated, the spring 74 will retain the paddle 83 in contact with the felt so that the valving element 79 is moved to closed position within the valving orifice 69.

When such movement occurs, the bleeding of air through the valving aperture 69 is decreased, or even interrupted, so that pressure within the diaphragm pressure chamber 57 increases, causing an upward movement of the bearing saddle with the increased pressure within the chamber being enough, in combination with the springs 61, to bear the weight of the bearing saddle and that end of the bearing journaled thereby.

If, however, the felt 83 shifts to the left, then the paddle 83 is shifted to its left-hand position, as illustrated in Figure 5; the valving element 79 is pulled axially from the bleed passage 69 and a greater amount of fluid pressure is bled through the valving aperture, decreasing the pressure within the chamber 59 and allowing the diaphragm 49 to deflect downwardly due to the less pressure within the chamber for supporting the bearing saddle and that end of the roll journaled thereby.

It will be seen that in this manner vertical movement of the bearing saddle in the supported end of the roll may be readily correlated with movement of the paddle 83, thereby making possible the smooth, even guiding of the felt 85 about the roll 26.

It will be understood that modifications and variations may be effected without departing from the scope of the novel concepts of the present invention.

I claim as my invention:

1. An air operated vertical support for a paper machine roll comprising spaced uprights provided with facing trackways, a bearing saddle vertically movable between the uprights and including a lower section provided with rollers contacting said trackways and an upper section hingedly carried by said lower section and cooperating therewith to confine a bearing journal of said roll therebetween, means defining a closed diaphragm chamber vertically aligned with said bearing saddle, a flexible diaphragm closing said chamber, means carried by the diaphragm extending into engagement with the bearing saddle, spring means interposed between the bearing saddle and the diaphragm for bearing a portion of the weight of said bearing saddle, and means for supplying fluid under pressure to said diaphragm chamber.

2. An air operated vertical felt guide for guiding a felt trained about a guide roll, comprising a pair of spaced uprights having interior opposed trackways, a bearing saddle interposed between said uprights and having rollers contacting said trackways and guided thereby to accommodate vertical movement of said bearing saddle therebetween, said bearing saddle having a central portion receiving one end of said roll therein, an air impermeable flexible diaphragm disposed beneath said bearing saddle in vertical alignment therewith, means projecting beyond said diaphragm for supporting a portion of the weight of said bearing saddle, means defining a diaphragm chamber in communication with said diaphragm for receiving fluid under pressure, and a plurality of compression springs interposed between said diaphragm and said bearing saddle to aid in supporting the weight of said bearing saddle and said roll.

3. Guide apparatus for a felt trained about a guide roll comprising spaced uprights, means interposed between the uprights and guided thereby for vertical movement therebetween, and cooperating fluid pressure responsive means and spring means for supporting the weight of said first named means, said fluid pressure responsive means being vertically displaceable to shift the position of said first mentioned means between said uprights.

4. A guide for a felt trained about a guide roll comprising spaced vertically extending trackways, a bearing saddle interposed between the trackways, means on the bearing saddle in rolling contact with said trackways for guiding movement of the bearing saddle in a vertical direction, a source of fluid under pressure, pressure responsive means vertically aligned with the bearing saddle for shifting the position thereof between said trackways, and valve means in control of communication between said source and said pressure responsive means and responsive to the path of travel of said felt for determining the pressure to which said fluid pressure responsive means is subjected, thereby determining the vertical position of said bearing saddle.

5. In a vertically movable guide for a felt trained about a guide roll, a vertically displaceable bearing saddle for supporting one end of the guide roll, fluid pressure responsive means for shifting the position of said bearing saddle, and a plurality of compression springs interposed between said means and said bearing saddle for supporting a portion of the weight of said bearing saddle and for varying the degree of fluid pressure necessary to shift said saddle.

6. A felt guide for vertically shifting one end of a guide roll to accurately train a felt thereabout comprising a bearing saddle supporting said one end of said roll, means guiding said bearing saddle for movement in a vertical plane, a source of fluid pressure, a fluid pressure-responsive diaphragm disposed for flexing movement in the plane of movement of said bearing saddle, means carried by the diaphragm for supporting said bearing saddle and for shifting the same in said plane as a consequence of diaphragm movement, means for conducting fluid pressure from said source to said diaphragm, and a bleed valve in control of said conducting means and controlled by deviation of said felt from its normal path of travel for determining the fluid pressure on said diaphragm.

7. A guide for a travelling felt trained about a guide roll comprising a bearing saddle for supporting one end of said roll, means guiding said bearing saddle for vertical shifting movement, and means for vertically shifting the position of said bearing saddle including a source of fluid pressure, an enclosed chamber for receiving fluid under pressure from said source, pressure-responsive means enclosing said chamber and projecting therebeyond into load-supporting relation with said bearing saddle, a bleed valve responsive to deviations in felt travel for controlling fluid pressure in said chamber, and means for actuating said bleed valve in accordance with the path of travel of said felt trained about the guide roll.

8. In combination with a bearing saddle for vertically shifting one end of a guide roll, means for supporting the bearing saddle and vertically shifting the saddle comprising a source of fluid pressure, a diaphragm responsive to fluid pressure for flexing in the direction of movement of said bearing saddle, means movable with the diaphragm and projecting therebeyond into contact with said bearing saddle to support a portion of the weight thereof, and a plurality of compression springs interposed between said bearing saddle and said diaphragm for supporting the remainder of the weight of said diaphragm, the proportion of the weight of said bearing saddle supported by said springs being dependent upon the relative vertical position of said bearing saddle.

9. In a mechanism for shifting the vertical position of one end of a guide roll, a bearing saddle receiving the one end of said roll, means guiding the bearing saddle for vertical movement, a source of fluid under pressure, a flexible diaphragm subject to differential fluid pressure for flexing movement in the plane of movement of the bearing saddle, means carried by the diaphragm and projecting therebeyond for contacting the bearing saddle to cause corresponding movement of said bearing saddle upon flexing of said diaphragm, and a plurality of springs interposed between the bearing saddle and said diaphragm for aiding the diaphragm in supporting the weight of this bearing saddle, the proportion of weight borne by said springs being inversely proportional to the differential fluid pressure applied to said diaphragm.

10. A guide for an endless web, comprising a roll against which a generally vertical run of the web is trained, a bearing support for one end of said roll, members defining guides for vertical movement of said support therein, fluid pressure-activated means operatively connected to said support to impart upward movement thereto and to support at least part of the gravity weight of said support and roll end, a source of fluid under pressure connected to said fluid pressure-actuated means, and means communicating with said fluid pressure-actuated means and responsive to lateral shifting of said web relative to its normal alignment against said roll controlling the fluid pressure to said pressure-actuated means to vary the supporting force applied to said support and thus the vertical position of said roll end to compensate for lateral shifting of the web and return said web to its normal alignment.

11. A guide for an endless web, comprising a roll against which a generally vertical run of the web is trained, a bearing saddle for one end of said roll, members defining guides for vertical movement of said saddle therein, fluid pressure-activated means operatively connected to said saddle to impart upward movement thereto and to support at least part of the gravity weight of said saddle and roll end, a source of fluid under pressure connected to said fluid pressure-activated means, spring means interposed between said bearing saddle and said fluid pressure-activated means to support the remainder of the gravity weight of said saddle and roll end, the proportion of weight supported by said fluid pressure-activated means and said spring means respectively varying in accordance with the vertical shifting of said bearing saddle, and means in communication with said fluid pressure activated means and responsive to lateral shifting of said web relative to its normal alignment against said roll controlling the fluid pressure to said pressure-activated means to vary the supporting force applied to said saddle and thus the vertical position of said roll end to compensate for lateral shifting of the web and return said web to its normal alignment.

12. In air operated support apparatus for a paper machine roll comprising spaced support members provided with parallel facing trackways, a bearing saddle movable between the support members longitudinally of the trackways and including a first section provided with rollers contacting said trackways and a second section hingedly carried by said first section and cooperating therewith to confine a bearing journal of said roll therebetween, means defining a closed diaphragm chamber aligned with said bearing saddle longitudinally of the trackways, a flexible diaphragm closing said chamber, means carried by the diaphragm extending into engagement with the bearing saddle, spring means interposed between the bearing saddle and the diaphragm, and means for supplying fluid under pressure to said diaphragm chamber.

13. Guide apparatus for a felt trained about a guide roll comprising faced support members, means interposed between the support members and guided thereby for movement longitudinally therebetween, and cooperating fluid pressure responsive means and spring means resisting movement of said guide roll in response to pressure upon said felt, said fluid pressure responsive means being displaceable longitudinally to shift the position of said first mentioned means longitudinally between said support members.

14. A guide for a felt trained about a guide roll comprising faced longitudinally extending trackways, a bearing saddle interposed between the trackways, means on the bearing saddle in rolling contact with said trackways for guiding movement of the bearing saddle longitudinally of the trackways, a source of fluid under pressure, pressure responsive means longitudinally aligned with the bearing saddle for shifting the position thereof between said trackways, and valve means in control of communication between said source and said pressure responsive means responsive to the path of travel of said felt for determining the pressure to which said fluid pressure responsive means is subjected, thereby determining the longitudinal position of said bearing saddle.

LLOYD HORNBOSTEL.

References Cited in the file of this patent

UNITED STATES PATENTS

| Number | Name | Date |
|---|---|---|
| 1,414,940 | Ford | May 2, 1922 |
| 2,199,893 | Norton et al. | May 7, 1940 |
| 2,291,830 | Obenshain | Aug. 4, 1942 |
| 2,431,557 | Hornbostel | Nov. 25, 1947 |